(12) United States Patent
Liu et al.

(10) Patent No.: US 11,509,195 B2
(45) Date of Patent: Nov. 22, 2022

(54) COLUMN TYPE CORELESS MOTOR

(71) Applicant: Shandong Huasheng Agricultural Pharmaceutical Machinery Co., Ltd., Shandong (CN)

(72) Inventors: Jiaping Liu, Shandong (CN); Jinguang Huang, Shandong (CN); Guangxiang Liu, Shandong (CN); Yiqun Shao, Shandong (CN); Jingguo Cui, Shandong (CN); Qian Wang, Shandong (CN)

(73) Assignee: SHANDONG HUASHENG AGRICULTURAL PHARMACEUTICAL MACHINERY CO., LTD., Shandong (CN)

( * ) Notice: Subject to any disclaimer, the term of this patent is extended or adjusted under 35 U.S.C. 154(b) by 154 days.

(21) Appl. No.: 17/002,593

(22) Filed: Aug. 25, 2020

(65) Prior Publication Data
US 2021/0126510 A1 Apr. 29, 2021

(30) Foreign Application Priority Data
Oct. 26, 2019 (CN) .......................... 201911026468.7

(51) Int. Cl.
*H02K 1/2786* (2022.01)
*H02K 3/47* (2006.01)
(Continued)

(52) U.S. Cl.
CPC .............. *H02K 9/06* (2013.01); *H02K 1/2786* (2013.01); *H02K 3/47* (2013.01); *H02K 5/20* (2013.01); *H02K 21/22* (2013.01); *H02K 7/083* (2013.01)

(58) Field of Classification Search
CPC ............ H02K 3/47; H02K 5/20; H02K 5/207; H02K 9/06; H02K 16/02; H02K 21/22; H02K 21/227
(Continued)

(56) References Cited

U.S. PATENT DOCUMENTS 5,861,688 A * 1/1999 Adelski .................... H02K 5/20
310/58
2002/0171306 A1 * 11/2002 Graham .................... H02K 1/27
310/208
(Continued)

FOREIGN PATENT DOCUMENTS

FR 2673776 A3 * 9/1992 ............. H02K 1/278
WO WO-2015092884 A1 * 6/2015 ............... H02K 3/04
WO WO-2018078779 A1 * 5/2018 ............... H02K 7/14

*Primary Examiner* — Eric Johnson
(74) *Attorney, Agent, or Firm* — Kinney & Lange, P.A.

(57) ABSTRACT

A column type coreless motor is provided, having has no iron loss, low heat loss and high efficiency. The motor includes a stator, a rotor and a motor housing, wherein the rotor is a column type structure with a U-shaped annular groove, and the stator is placed in the U-shaped annular magnetic field of the rotor. In some embodiments, the stator is made by solidifying a coil therein with a thermosetting material through a pressure device, and the coil is wound by combining multiple enameled wires into a phase line, successively superposing three-phase lines, and winding each phase line in a toothed circle shape. The rotor is provided with a heat dissipation fan, and the fan discharges the heat generated by the coil out of the motor through a heat dissipation air passage in the motor housing, effectively ensuring the heat dissipation effect of the motor.

3 Claims, 3 Drawing Sheets

(51) Int. Cl.
  *H02K 5/20*    (2006.01)
  *H02K 9/06*    (2006.01)
  *H02K 21/22*   (2006.01)
  *H02K 7/08*    (2006.01)
(58) Field of Classification Search
  USPC .......................................................... 310/266
  See application file for complete search history.

(56) References Cited

U.S. PATENT DOCUMENTS

| | | | | |
|---|---|---|---|---|
| 2009/0284087 | A1* | 11/2009 | Takahashi | H02K 5/18 |
| | | | | 310/64 |
| 2013/0187487 | A1* | 7/2013 | Honda | H02K 1/278 |
| | | | | 310/43 |
| 2017/0288489 | A1* | 10/2017 | Shiraki | H02K 9/02 |

\* cited by examiner

COLUMN TYPE CORELESS MOTOR

CROSS REFERENCE TO RELATED APPLICATION

This application claims the priority of Chinese Patent Application No. 201911026468.7, entitled "COLUMN TYPE CORELESS MOTOR" filed with the Chinese Patent Office on Oct. 26, 2019, which is incorporated herein by reference in its entirety.

TECHNICAL FIELD

The disclosure relates to a column type coreless motor which is an external-rotor motor without an iron core, and has advantages of simple structure, high efficiency, and extremely low heat generated by coil, no iron loss and low heat loss. The disclosure solves simultaneously problems of small power, heavy weight, short endurance time and poor reliability for other motors with the same volume. The motor in the disclosure is particularly adapted to be used as a mating power for modern garden equipment and small electric tools. The column type coreless motor provided by the disclosure has advantages of low noise, strong power, light and compact body, stable quality, firmness and durability, and will promote the innovative development of mating power in the art.

BACKGROUND

Traditional brush motor and brushless motor all are composed of silicon steel sheets and coil windings, and exist defects of greater weight and bodily form, and especially due to the existence of silicon steel sheets, greater iron loss and copper loss are induced, and a vortex generated after motor is power on also can produce energy loss. These drawbacks have limited greatly the promotion of motor efficiency and endurance time. The existing similar motor is not equipped with a corresponding heat dissipation system, so that heat of the motor cannot be discharged in time, affecting a reliability and a efficiency of the motor, and assembly process and assembly requirement are higher. In addition, dynamic balance of a rotor needs to be specially performed. Overall performance is difficult to make a large breakthrough due to limitations of conditions. Therefore, a motor which is highly efficient, convenient to install, simple, reliable and in a modular assembly mode urgently needs to be provided to meet current requirements of people, thus to reduce the labor burden and improve production efficiency.

As with continuous development of lithium batteries, electric tools gradually enter into people's life, and various electric tools for different purposes become necessary tools for every family in European and American developed countries and regions. As a core of electric products, the motor self-evidently plays a significant role in the development, so that a high-efficiency and energy-saving motor technology will become a key to improve electric products.

SUMMARY

The embodiments aim to provide a high-efficiency and energy-saving column type coreless motor.

The technical solution of the disclosure is as follows: a column type coreless motor comprises a body composed of a motor housing, a rotor and a stator. The rotor is manufactured into a column type structure with a U-shaped annular groove, and is made of high-strength iron materials, effectively ensuring a rotational inertia of the motor. An inner side surface of the U-shaped annular groove is evenly provided with several pairs of permanent magnets, and a clamp sleeve type structure of an upper end cover and a lower end fan is provided and fastens the pairs of permanent magnets to the core shaft, for preventing the permanent magnets from falling off due to a centrifugal force generated through high-speed rotation; an inner side surface of the U-shaped structure is secured in a position by an annular boss of the lower end heat dissipation fan for ensuring the consistency of installation of the permanent magnets.

A heat dissipation air passage is ingeniously arranged in the housing structure, and discharges effectively therefrom heat generated by the motor coil through an action of the fan, and the housing is made of aluminum alloy materials, to reduce a weight of the motor, and ensure a heat dissipation effect of the motor.

The stator is made by solidifying a coil therein with a thermosetting material through a pressure device, the coil is wound by means of combing multiple strands into a wire, superposing three-phase and tooth-shaped circumferential continuous winding method. The entire stator is positioned against a surface of an upper circular flange, so that the coil portions are evenly distributed in an annular magnetic field of the U-shaped structure rotor.

Compared with the prior motor technology, the disclosure has advantages as follows. The rotor is a column type structure with a U-shaped annular groove surrounded by a core shaft, a heat dissipation fan and a rotor housing for accurately positioning and installing the stator. The outer-rotor motor has large rotational inertia. The coil in the stator is wound by means of combining multiple enameled wires into a phase line; successively superposing three-phase lines, i.e., a U-phase line, a V-phase line and a W-phase line; and winding each phase line in a toothed circle shape, which makes winding more convenient and reliable. The stator is made by solidifying a coil therein using a thermosetting material through pressure equipment, without additional medium, iron loss, and with less heat loss and more reliable performance. An inner side surface of the motor housing (1) is provided with a vane-type heat dissipation air passage, which can effectively ensure the heat dissipation effect and maximize the efficiency of the motor. The installation and positioning of the motor are accurate and reliable, without a need of performing dynamic balance.

Figure 1:
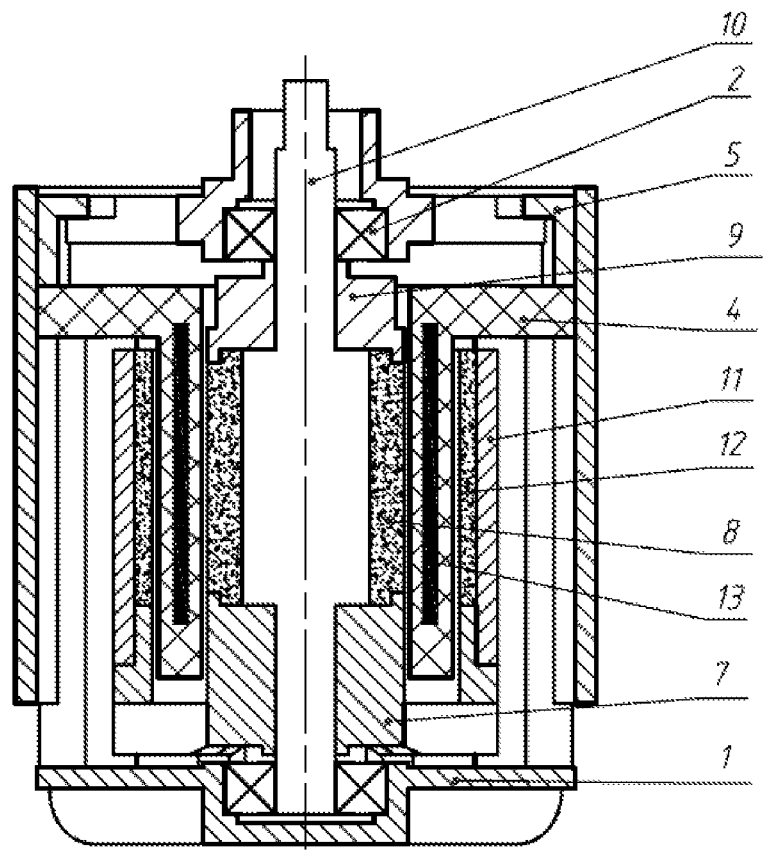
FIG. 1 is a schematic view of a structure of a column type coreless motor of the present disclosure.

The reference numerals in the Drawings are as follows: 1—a motor housing; 2—a bearing; 3—a rotor; 4—a stator; 5—an upper pressing cover; 6—a screw; 7—a heat dissipation fan; 8—an inner permanent magnet; 9—a clamp sleeve; 10—a core shaft; 11—a rotor housing; 12—an outer permanent magnet; 13—a coil; 14—a thermosetting material.

DETAILED DESCRIPTION OF THE EMBODIMENTS

Figure 2:
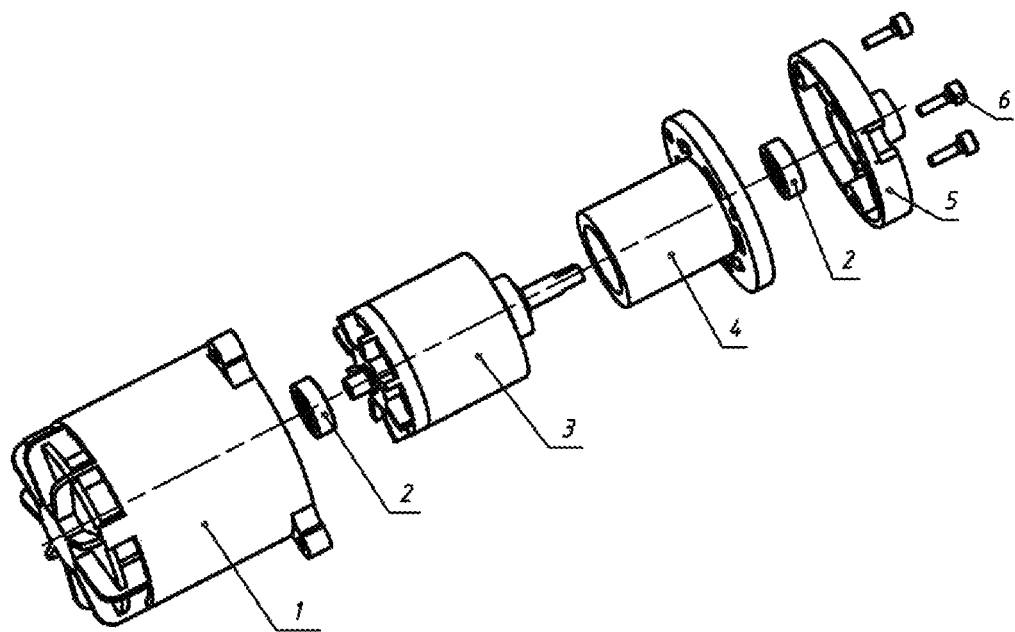
FIG. 2 is a schematic view of installation of the column type coreless motor of the present disclosure.

A whole structure of a motor is shown in FIGS. 1 and 2, a bearing 2 is pressed and fitted on each of two ends of a mandrel 10 in a rotor 3, the rotor 3 with the bearings pressed and fitted on its both ends is installed on a motor housing 1 along a direction shown in FIG. 2, and then a stator 4 is placed in a U-shaped annular groove of the rotor 3, an upper pressing cover 5 is placed above the stator 4 along the direction shown in FIG. 2, and finally the upper pressing cover 5 and the stator 4 are fixed on the motor housing 1 by screws 6.

Figure 3:
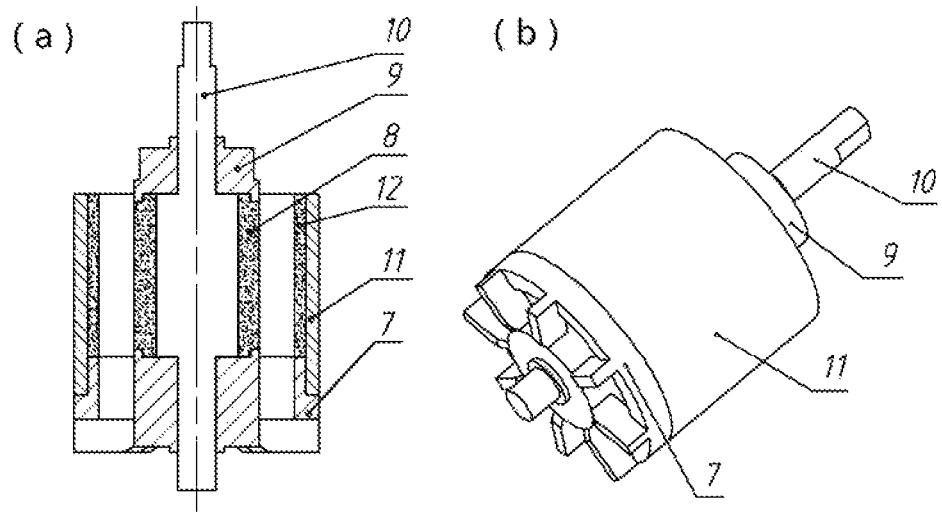
FIG. 3 is a schematic view of a structure of a rotor of the column type coreless motor according to the present disclosure.
Figure 4:
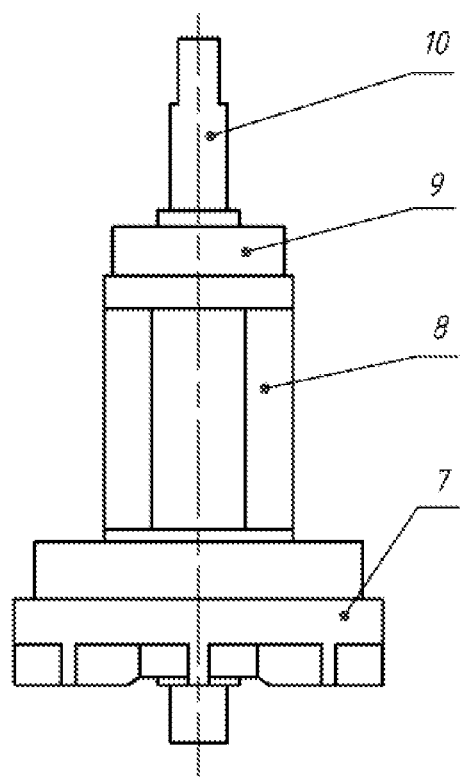
FIG. 4 is a schematic view of an assembly structure of a core shaft of the column type coreless motor of the present disclosure.

As shown in FIG. 3, the rotor 3 is formed by attaching permanent magnets on two sides of a U-shaped inner chamber formed by a core shaft 10, a heat dissipation fan 7 and a rotor housing 11. A structure of an inner layer of the rotor is shown in FIG. 4, inner permanent magnets 8 are attached on the core shaft 10 in a manner that N, S poles are alternately arranged, the heat dissipation fan 7 and a clamp sleeve 9 are pressed and fitted on two ends of the core shaft 10 respectively to snap annular necks of the heat dissipation fan 7 and the core shaft 10 into the grooves of the inner permanent magnets 8 for locking the inner permanent magnets 8 on the core shaft 10 together. The outer permanent magnets 12 are evenly adhered to an inner surface of the rotor housing 11 with an adhesive in a manner that N, S poles are alternately arranged, to form an outer portion of the rotor, and the outer portion of the rotor is pressed and fitted to the heat dissipation fan 7 to form an integral rotor 3. The heat generated by a coil is blown by the heat dissipation fan 7 to heat dissipation guide vanes 15 on the motor housing 1 and flows through the heat dissipation air passage formed by the vanes out of one end of the air passage, so as to play a role of directional heat dissipation.

Figure 5:
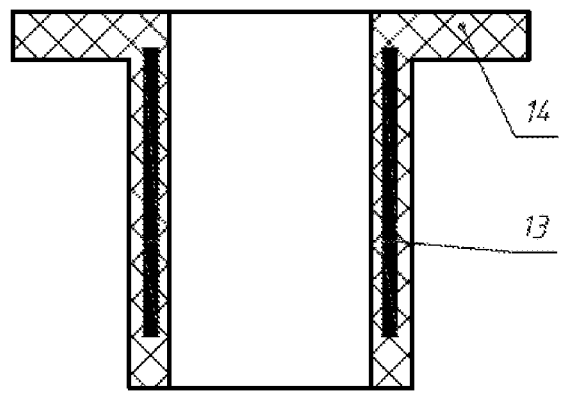
FIG. 5 is a schematic view of a structure of a stator of the column type coreless motor of the present disclosure.

As shown in FIG. 5 which illustrates a structure of the stator 4, peripheral portion thereof is made of a special thermosetting material 14 by pouring, heating and press forming o, an inner coil 13 thereof is formed by winding an enameled wires coated with a special material at its outer side by virtue of a special forming process equipment. The enameled wire is wound around the forming process equipment by means of combining multiple enameled wires into a phase line; successively superposing three phase lines, i.e., a U-phase line, a V-phase line and a W-phase line; and winding each phase line in a toothed circle shape.

Figure 6:
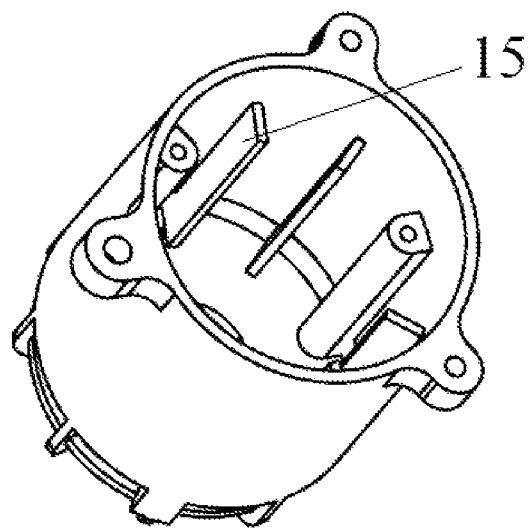
FIG. 6 is an isometric view of a housing of the column type coreless motor of the present disclosure.

The column type coreless motor described in the disclosure is fixed on a required equipment through an unthreaded hole on an outer end face of the motor housing 1 shown in FIG. 6 by bolts, and a power of the motor is transmitted to the equipment to implement cooperation.

The column type coreless motor described in the disclosure is powered by a lithium battery or a constant voltage direct current power supply, current is regulated by a controller and passes through a annular-shaped closed coil 13 with constant magnetic flux to drive a rotor 3 to rotate, and an intermediate core shaft 10 outputs the power to the used equipment. Finally, a conversion from electric energy to kinetic energy is completed.

What is claimed is:

1. A column-type coreless motor, comprising a body which includes a motor housing, a rotor and a stator, wherein the motor is configured so that the rotor is supported by bearings in the motor housing and an upper pressing cover, and the stator is placed in a U-shaped annular magnetic field of the rotor and is fixed by a screw after being positioned by the upper pressing cover and the motor housing, and wherein:

the rotor is a column type structure with a U-shaped annular groove which is formed by a core shaft, a heat dissipation fan and a rotor housing;

an end face of the rotor is provided with the heat dissipation fan which is embedded on the rotor housing;

an inner side of the motor housing is provided with a vane-type heat dissipation air passage; and the rotor includes six portions of the core shaft, the heat dissipation fan, a clamp sleeve, inner permanent magnets, outer permanent magnets and the rotor housing, wherein the inner permanent magnets are attached to an outer periphery of the core shaft, and the outer permanent magnets are fixed on an inner side surface of the rotor housing, the inner permanent magnets are locked on the core shaft by press-fitting the heat dissipation fan and the clamp sleeve on two ends of the core shaft respectively to snap annular protrusions of the heat dissipation fan and the clamp sleeve into grooves of the inner permanent magnets.

2. The column-type coreless motor according to claim 1, wherein the heat dissipation fan and the heat dissipation air passage on the motor housing constitutes a heat dissipation system, and wherein a principle of the heat dissipation system is as follows:

heat generated by a coil is blown by the heat dissipation fan to heat dissipation guide vanes on the motor housing and flows through the heat dissipation air passage formed by the vanes out of one end of the air passage, to play a role of directional heat dissipation, and airflow of the directional heat dissipation.

3. The column-type coreless motor according to claim 1, wherein:

the stator is made by solidifying a coil therein with a thermosetting material through a pressure device; and the coil is wound by combining multiple enameled wires into a phase line, successively superposing three-phase lines, including a U-phase line, a V-phase line and a W-phase line.

\* \* \* \* \*